Figure 1:
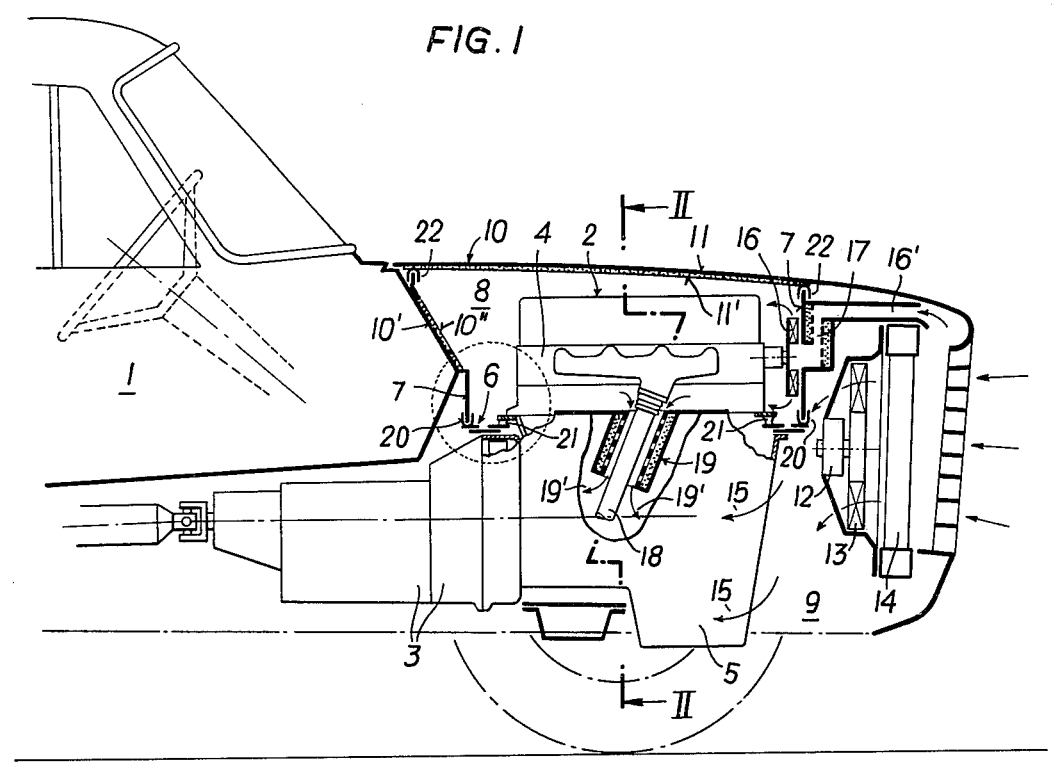

United States Patent [19]

Skatsche et al.

[11] 4,164,262
[45] Aug. 14, 1979

[54] MOTOR VEHICLE

[75] Inventors: Othmar Skatsche; Heinz Fachbach; Gerhard Thien; Hans List; Josef Greier, all of Graz, Austria

[73] Assignee: Hans List, Graz, Austria

[21] Appl. No.: 836,216

[22] Filed: Sep. 23, 1977

[51] Int. Cl.² .................................................. B60K 11/00
[52] U.S. Cl. .............................. 180/54 A; 123/41.7; 123/195 C; 180/69.1; 181/204
[58] Field of Search ................ 180/54 A, 69.1, 64 A; 181/204, 205, 200; 123/41.7, 41.6, 195 C, 198 E

[56] References Cited
U.S. PATENT DOCUMENTS

| 2,247,742 | 7/1941 | Best | 180/54 A |
|---|---|---|---|
| 2,972,340 | 2/1961 | Bertsch | 123/41.6 |
| 3,147,814 | 9/1964 | Suhre | 180/54 A |
| 3,882,951 | 5/1975 | Conley | 180/54 A |
| 3,951,114 | 4/1976 | Fachbach et al. | 181/204 |
| 4,060,142 | 11/1977 | Abe | 181/204 |
| 4,071,008 | 1/1978 | Skatsche et al. | 181/204 |

FOREIGN PATENT DOCUMENTS 2620774  12/1976  Fed. Rep. of Germany ........ 180/54 A Primary Examiner—David M. Mitchell
Attorney, Agent, or Firm—Watson, Cole, Grindle & Watson

[57] ABSTRACT

A motor vehicle has an engine equipped with an oil sump which is secured in a body-sound-insulated manner to the engine block, and a fan-cooled water radiator, a frame-mounted elastic membrane being provided between the oil sump and the vehicle body components so that the membrane completely encircles the oil sump at its upper edge and provides an acoustic separation between the spaces respectively situated above and below the oil sump, the upper space comprising a sound suppressing encapsulation which is closed relative to the vehicle interior by appropriate wall panels, partitions and sealing sections provided in the vehicle body. The outflow of hot cooling air from the radiator completely by-passes the encapsulation, the sealed upper space of the encapsulation being cooled by the forced draught of a further fan, and sound absorbing silencers being provided at inlet and outlet openings for the cooling air in the encapsulation.

7 Claims, 3 Drawing Figures

MOTOR VEHICLE

This invention relates to a motor vehicle having an engine which is provided with an oil sump secured in a body-sound-insulated manner to the engine block, and having a fan-cooled water-radiator.

It is commonly known that the total noise emission from a vehicle consists of the individual component noises which are produced by the exhaust system, the air intake system, the cooling unit, the surface of the drive unit comprising the engine and gearbox and, to a lesser extent also by the rear axle and the vehicle body. Various methods and means have already been adopted for reducing exhaust and air-intake noise as well as the noise produced by the cooling unit, that is, fan noise. The conventional arrangements for reducing engine-surface and possibly also gearbox noise, (disregarding for the present any provisions of limited effect at the points of noise origin, e.g. pressure increase in diesel combustion, mechanical knocking of pistons, gears, etc.) involve the provision of noise-suppressing engine encapsulations or the construction of special low-noise engines which comprise an outer casing which is body-sound insulated relative to the operative internal engine structure.

Noise-suppressing engine encapsulations have been designed either in the form of a capsule which is completely separate from the vehicle body and elastically supported on the engine, or in the form of an encapsulation assembled partly from component parts of the vehicle body or superstructure, and in the latter case the required body sound insulation between the capsule assembly and the engine is achieved by means of elastic engine mountings. Both of these existing arrangements inevitably involve, even with optimum design, a certain additional outlay in weight, volume and costs, and reduce accessibility of the parts of the engine which require service and maintenance.

It has further been proposed to design a "low-noise" engine by connecting those parts which are subject to direct acoustically generated vibration, namely the engine suspension complete with the cylinder head and auxiliary units mounted thereon, by means of at least one body-sound-insulating element secured to the engine mounting or suspension and to the crankcase which may be combined with the flywheel housing. The crankcase would then be provided with, or carry a sound-suppressing cowling or hood fully enclosing the cylinder head as well as the auxiliary units. While such an arrangement entails somewhat less additional outlay than a full encapsulation the non-oil-wetted hood or cowling in the upper region of the engine still adds to overall weight and access for repair, and maintenance work is considerably impaired.

According to this invention, a motor vehicle is provided as having an engine equipped with an oil sump which is secured, in a body-sound-insulated manner, to the engine block and a fan-cooled water radiator, characterised in that a frame-mounted elastic membrane is provided between the oil sump and vehicle body components so that the membrane completely encircles the oil sump at its upper edge and provides an acoustic separation between the spaces respectively situated above and below the oil sump, the upper space being converted, in a conventional manner, into a sound-suppressing encapsulation which is closed relative to the vehicle interior by appropriate wall panels, partitions and sealing sections provided in the vehicle body, and the outflow of hot cooling air from the radiator completely by-passing the encapsulation.

The present invention provides the frame-like elastic membrane, e.g. a rubber membrane or diaphragm, between the oil sump and the parts of the superstructure of the body of the vehicle surrounding the latter, at the level of the upper edge of the oil sump, and this provides an acoustic separation of the areas above and beneath the sump. The area above the sump can be conventionally encased by a complete encapsulation relative to the vehicle formed partly by component parts of the vehicle body and partly by capsule wall and sealing strip sections, and the cooling air, heated by the radiator, being conducted away completely externally of this encapsulation. Such an arrangement, besides affording a high degree of noise suppression, offers the chief advantage of minimal additional weight in as much as no engine capsule is required. Another special advantage resides in that maintenance and service points are freely accessible as soon as the engine hood or bonnet is opened. It also provides very favorable airflow conditions for a downwardly directed outflow a cooling air away from the main fan and cooling radiator unit in the absence of a capsule in the region of the oil sump.

Advantageously, intermediate decks or partitions may be provided which surround the engine in spaced relation therewith and are connected to the membrane and with the original vehicle body parts, noise absorption thereby being still further improved without the cost of little extra weight and expense. Naturally such intermediate decks or partitions would be arranged in such a manner as not to impair the free accessibility of the engine.

For improving and simplifying the acoustic seal it is preferable to secure an outwardly projecting rigid frame to the oil sump which is engaged by the frame-like elastic membrane secured to the vehicle body parts.

According to a preferred embodiment of the invention the upper, sealed interior of the sound-absorbing encapsulation is forcibly ventilated and cooled in a conventional manner by its own fan, and silencer means are provided at the air inlet and outlet openings in the encapsulation. In view of the fact that only comparatively small amounts of air are required for adequate ventilation and cooling of this upper space this arrangement is advantageous, as compared with those conventional constructions wherein the entirety of the outflowing air stream from the radiator unit is conducted through the encapsulation. Also, the cooling air inlet and outlet openings may be of considerably smaller cross-section than used and consequently, the silencers for absorbing the sound dispersed through these openings may be of much smaller dimensions and can occupy considerably less space.

According to a further feature of this invention, the cooling air inlet in the encapsulation may be located away from the out flow path of the hot air from the main radiator unit. In other words, the cooling air inlet opening for the cooling air required to cool the interior of the encapsulation is arranged in such a way, and at such a position that no hot air coming from the engine radiator can pass through into the interior of the encapsulation. This is extremely important because it prevents an undesirable build up of heat in this area. For example, for this purpose an air intake pipe may be extended forwardly to a point beyond the radiator. Thus, only comparatively small volumes of cooling air are needed to remove excess heat from the interior of the encapsulation.

In a further development of this invention, the cooling air flow entering the interior of the sound-suppressing capsule may be split up into two streams by means of baffle plates provided between the exhaust system and the remaining engine parts, one of the streams being conducted to flow over the hot parts of the exhaust system and the other to cool the remaining engine surfaces. These streams may be conducted outwardly through relatively spaced and separate outlets in the casing. This type of cooling air-flow pattern has the advantage of a purposefully directed and controlled air cooling with due regard to the relatively different cooling requirements of the exhaust system and the less hot engine surface areas, thereby permitting economies in cooling capacity for the interior of the encapsulation. Preferably, and with special advantage, the cooling airflow is discharged through a sound absorption silencer concentrically arranged around the exhaust pipe and spaced therefrom. Such disposition for the cooling air outlet from the encapsulation is particularly advantageous because it gives optimal consideration to acoustic as well as to thermal demands. An undesirable transmission or conduction of heat from the exhaust pipe into the encapsulation in the region of the lead-through of the exhaust is thus fully and safely prevented by comparatively simple means.

According to a preferred embodiment of this invention the encapsulation is closed on the topside thereof by the engine cowling or hood of the vehicle, thereby providing the best possible and easiest manner of obtaining access to the engine. The arrangement also has other important advantages, especially with regard to manufacturing and assembly costs and also with regard to overall vehicle weight.

Finally, in accordance with this invention and for an enhanced effect thereof, those parts of the vehicle body which close the vehicle interior relative to the outside and are included as component parts in the noise-suppressing encapsulation, e.g. the dashboard, may be provided with enhanced or improved sound-absorbing properties. Such a provision is particularly sensible in association with the location of the noise-suppressing encapsulation around the upper engine parts. For, owing to the fact that the upper region of the engine compartment is converted into an entirely closed capsule, a diffuse sound field with very high sound levels tends to be created within the encapsulation owing to interferences which normally do not occur in conventional engine compartments of the kind which are open on their underside and on the side next to the heat exchanger. For this reason any increased sound proofing of the vehicle body panels or walls which form part of the noise-suppressing encapsulation is surprisingly effective.

Figure 3:
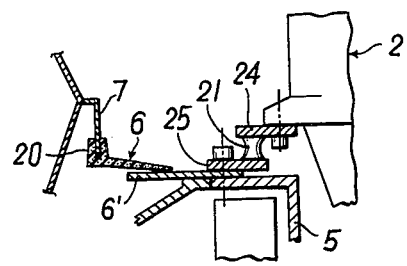
Figure 2:
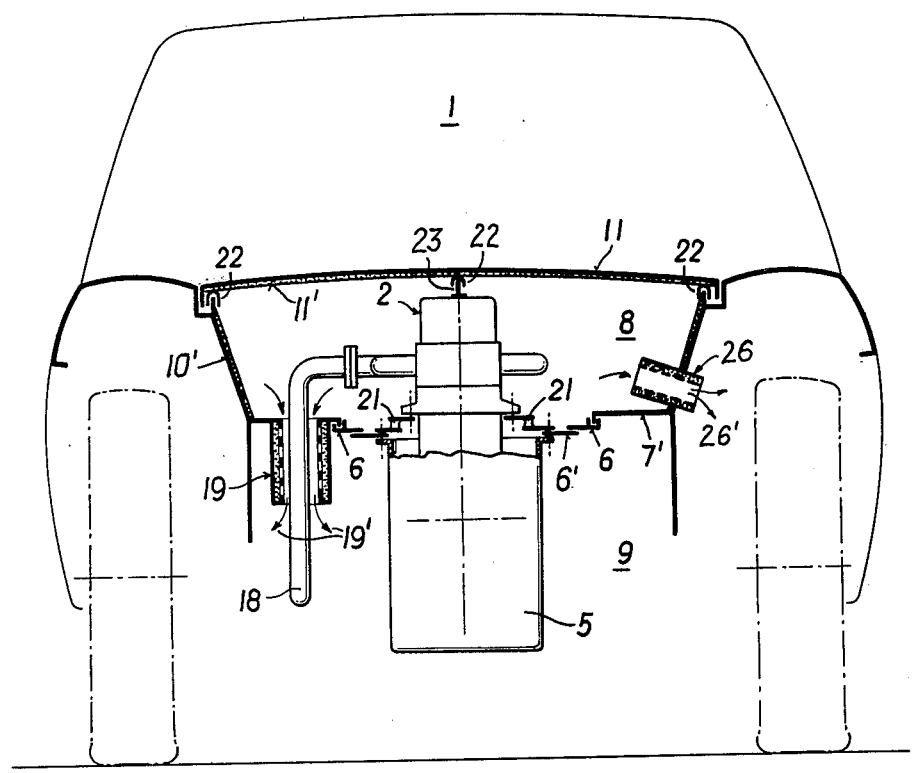

The invention is hereinafter more specifically explained with reference to an exemplary embodiment thereof illustrated diagrammatically in the accompanying drawings wherein:

FIG. 1 is a longitudinal view, partly in section of the front part of a motor vehicle incorporating the details of the invention FIG. 2 a sectional view taken substantially along line II—II of FIG. 1, and FIG. 3 is a partly-sectioned detail view of FIG. 1.

Referring to the embodiment depicted in the drawings, the motor vehicle 1 comprises an engine 2 having a variable speed gearbox and clutch 3 rigidly mounted thereon. It will be appreciated that the gearbox may also be arranged separately from the engine, e.g. in a vehicle with a front engine and rear-drive.

An oil sump 5 is secured in a body-sound insulated manner, by a frame-like rubber element 21, to the upper part of the engine 4. As shown in FIG. 3, this rubber element 21 is rigidly secured to and between two supporting frames 24, 25, preferably made of metal and of relatively different sizes, the frame 24 being secured to the engine 2, and the frame 25 being secured to the oil sump 5. Another rigid frame 6' is clamped between the oil sump 5 and the frame 25 so as to extend completely about the upper periphery of the oil sump 5. Between this outwardly projecting frame 6' and the adjacent vehicle body components, a frame-like rubber membrane 6 is provided which co-acts with the frame 6' and with the intermediate decks or partitions 7, 7' (FIG. 2) provided in the vehicle body or vehicle structure to provide an acoustic seal separating the upper area 8 above the membrane 6 from the lower area 9 below the membrane. The frame-like rubber membrane 6 is connected to the partitions 7, 7' by means of flanges or collar-like abutment and bearing parts 20. Additional sealing elements 22 (FIG. 2) may be fitted to the vehicle's structure to complete the encapsulation.

The upper part 4 of the engine 2 which is situated above the membrane 6 is not provided with a separate casing for sound-proofing. The effective encapsulation 10 for this engine part 4 is completed by other parts of the car body, namely the dashboard 10' and the hood 11. These panels may be additionally soundproofed by appropriate conventional insulation linings 10" and 11'.

An electric motor 12 drives a main fan 13 which delivers the main cooling air flow through a radiator 14. The heated air then flows through the lower area 9 beneath the membrane 6 and out, as shown by the arrows 15. A second fan 16 which is driven by the engine, draws fresh air through a pipe 16' which ends above and forwardly of the radiator 14, through an inlet silencer 17 into the space 8 above the membrane 6. At least some of this air leaves the upper spaces through an exhaust silencer 19, as indicated by the arrows 19', the silencer 19 being concentric to an exhaust pipe 18.

Preferably, as shown in FIG. 2, the cooling air in the encapsulation is divided into two streams, and may be achieved by suitable deflector plates 23. One stream leaves via the silencer 19 while the other stream, indicated by arrows 26', leaves the encapsulation by a separate outlet which also has a silencer 26.

We claim:

1. A motor vehicle, comprising a frame, an engine compartment defined by vehicle body components including side walls, a front wall and a rear end wall and containing an engine having an engine block mounted on said frame, said engine having an exhaust manifold, a water radiator and a fan associated therewith for cooling same, said engine having an oil sump, means dividing said compartment into an upper and a lower space, said oil sump being secured in a body-sound-insulating manner to said engine block, said dividing means comprising an elastic membrane disposed between said oil sump and said body components and completely surrounding said oil sump at an upper edge thereof, said upper space defining a closed sound-suppressing encapsulation which comprises said side walls, said front wall and said rear end wall, said encapsulation further comprising a substantially horizontal frame extending from said upper edge of said oil sump and in contact with said elastic membrane, a detachable cover at an upper side of said encapsulation, said radiator and said fan being located outside said encapsulation, and said radiator having a hot air exhaust path which by-passes said encapsulation.

2. The motor vehicle according to claim 1, wherein said horizontal frame extends outwardly of said oil sump, and said elastic membrane engaging said frame and being secured to said body components.

3. The motor vehicle according to claim 1, wherein an upper portion of said compartment is provided with an encapsulation ventilation fan and at least one inlet and one outlet duct for the ventilation of said encapsulation with air, said ducts being provided with sound absorbing silencers.

4. The motor vehicle according to claim 3, wherein an inlet end of said air inlet duct is disposed remote from said hot air exhaust path.

5. The motor vehicle according to claim 3, wherein deflector plates are disposed in said encapsulation separating said exhaust manifold from the other engine parts located within said encapsulation, said plates being arranged for dividing the air ventilation of said encapsulation into one stream flowing over hot regions of said manifold and into another stream cooling surfaces of said other parts, and including two outlet ducts having sound-absorbing silencers being provided in said walls of said encapsulation for outletting said streams.

6. The motor vehicle according to claim 1, wherein said cover comprises a vehicle hood having a lining of insulation material thereon.

7. The motor vehicle according to claim 6, wherein additional insulation linings are provided on said walls of said encapsulation.

* * * * *